Sept. 19, 1944.  M. F. HALL  2,358,571
AURAL INDICATOR OF AIR SPEED
Filed Aug. 16, 1943

M. F. Hall
INVENTOR.

BY CA Snowles.
ATTORNEYS.

Patented Sept. 19, 1944

2,358,571

UNITED STATES PATENT OFFICE 2,358,571

AURAL INDICATOR OF AIR SPEED

Michael Frank Hall, Redlands, Calif., assignor of one-tenth to E. John Ericksson, San Bernardino, Calif.

Application August 16, 1943, Serial No. 498,805

10 Claims. (Cl. 177—311.5)

This invention relates to a means for indicating aurally the speed of an airplane.

It is a fact well known to those skilled in flying, that many accidents have occurred to aircraft of all sizes because of loss of flying speed due to the pilot's failure to observe the indicated air speed while on the final landing approach.

When a pilot is approaching a landing and shifts his vision from the instrument panel back to the approach, the vision of the pilot, for a time, is impaired by imperfect focus and the length of time required to return the vision to focus depends largely upon the degree of visibility. Pilots are very conscious of this short period of semi-blindness, especially when landing under conditions of poor visibility in a fast airplane, the rapid change of distance due to the speed at which the airplane is travelling often resulting in crashes due to the limited period of poor vision above mentioned.

In most flight instruments used on aircraft the lag in instrument operation is an important factor which must be seriously considered and accounted for because failure to do so might have disastrous results.

An object of the present invention is to provide a means wherein the factor of lag is held at the minimum and wherein changes in air speed can be detected immediately within the earphones of the pilot, so that elements of lag or semi-blindness occurring where visual instruments are used, are eliminated.

A further object is to utilize light waves in connection with a photo-electric cell circuit and an oscillator circuit for transmitting to the earphones the impulses set up by the light waves, the signal thus generated and transmitted to the earphones being under the control of a Pitot tube whereby disturbances produced in the earphones are varied in proportion to the air speed.

A further object is to provide an apparatus which, under flying conditions at normal predetermined speeds, will produce negligible interference in the earphones so as not to disturb the reception of messages, said interference, however, increasing in proportion to changes in the speed so that the pilot will have ample warning either of excessive speed or of danger of stalling.

Another and principal object of the invention is to provide a means whereby a characteristic sound is produced which differs aurally when the speed of the airplane increases or decreases so that the pilot can thus determine whether the air speed has remained the same, increased, or decreased.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

Figure 1:
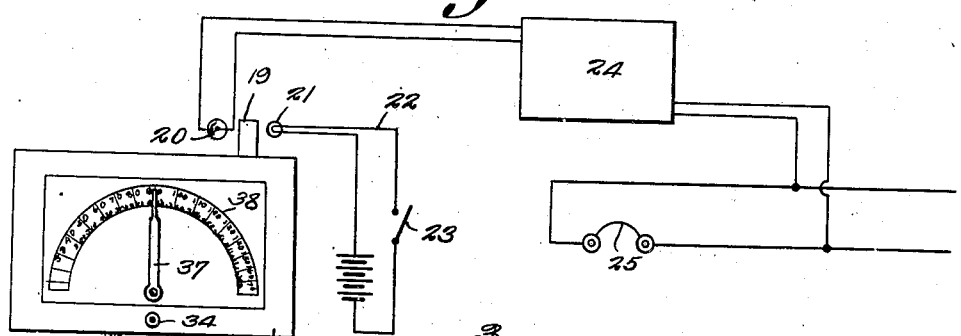
Figure 1 is a view showing in diagram the complete apparatus constituting the present invention.

Referring to the figures by characters of reference, 1 designates a Pitot tube of a well known type having a central chamber 2 open at its front end for dynamic pressure resulting from impact. This chamber 2 is surrounded by a chamber 3 in which static pressure is maintained, this chamber being in communication with the external atmosphere through ports 4 out of line of impact.

A tube 5 is extended from the pressure chamber 2 to a diaphragm 6 of the type commonly used in aircraft pressure instruments. Another tube 7 is extended from the static pressure chamber 3 and opens into an air-tight casing 8 in which the diaphragm is located.

A stem 9 is fixedly connected to the middle portion of one face of the diaphragm and is alined with another stem 10 fixedly connected to the opposed face of the diaphragm. Stem 9 is slidably mounted on and supported by a finger 11 projecting from one wall of the casing and is extended through a hanger 12 pivotally connected at 13 to the casing. This hanger has slots 14 in which are located pins 15 extending laterally from the stem 9. Thus by swinging the hanger 12 on its pivot, the stem 9 and the diaphragm can be advanced or retracted bodily within the casing 8.

Stem 10 constitutes a rack which is in constant mesh with a gear 16 which, as shown, is carried by a shaft 17 journalled in the casing 8 and carrying a disk 18 the marginal portion of which is positioned in a housing 19 on casing 8. This housing has a photo-electric cell 20 positioned at one side of the disk while a lamp 21 is mounted in the housing adjacent to the opposite side of the disk. The lamp 21 is included in an electric circuit 22 having a controlling switch 23 while the photo-electric cell circuit leads to the grid circuit of an oscillator which may be a part of a radio set and has been indicated generally at 24. This oscillator is in circuit with the headphones 25 used by the pilot and commonly employed for picking up signals while in flight.

The beam-controlling or modulating disk 18 is provided with a circular series of triangular openings arranged in two groups oppositely disposed, one group being indicated at 26 while the other group is indicated at 27. The groups diverge along curved lines in opposite directions from a series of minute openings 28 to a point indicated at 29. The group 27, extending from the opening 28 to the point 29 is shorter than the group 26 and located in the group 26 at a point substantially diametrically opposite to the small openings 28 is an opening 30 larger than the other openings.

The openings are so located that, during one complete rotation of the disk 18, all of the openings will be brought successively into position between the light element 21 and the photo-electric cell 20.

A nut 31 is pivotally mounted in the hanger 12 and is engaged by the threaded end 32 of a shaft 33. This shaft extends from the casing 8 and has a knob 34 by means of which the shaft can be rotated for the purpose of swinging the hanger 12 in either of two directions. By means of gears 35 and 36, motion may be transmitted from shaft 33 to an indicator or pointer 37 movable over a suitably calibrated dial indicated generally at 38.

Figure 2:
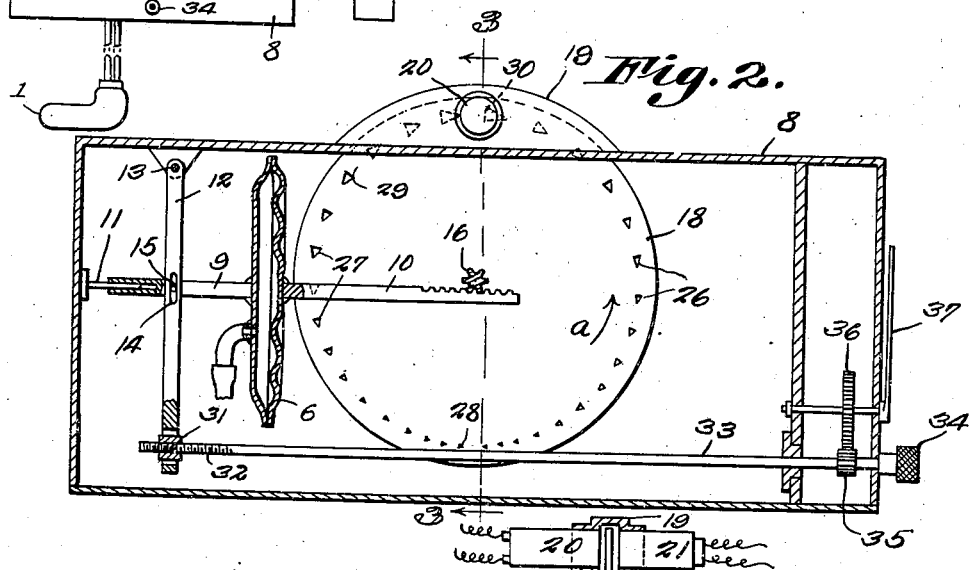
Figure 2 is a view partly in section and partly in elevation showing the diaphragm, the beam-controlling disk, and the operative connection between the diaphragm and disk.
Figure 3:
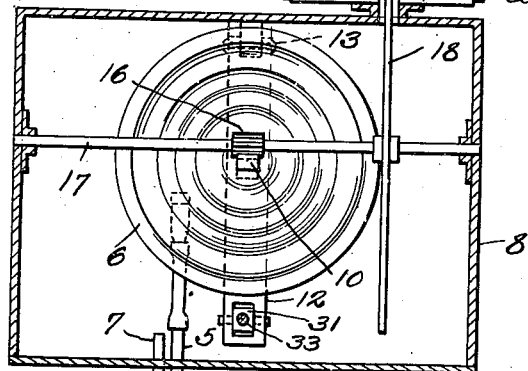
Figure 3 is a section taken substantially on line 3—3, Fig. 2.

Following the take-off and as the dynamic pressure in the diaphragm 6 increases, motion will be transmitted from the expanding diaphragm through stem or rack 10 and gear 16 to shaft 17 and disk 18 so that said disk will be rotated in the direction of arrow a in Fig. 2 with the result that the light beam from element 21 to the photo-electric cell 20 will be successively cut off by the walls of the triangular openings, thus producing a staccato effect in the phones the volume of which will gradually diminish as the size of the openings 26 become less and until the minute openings 28 are brought into the field of light. At that time the disturbance in the phones becomes negligible and will in no way interfere with the reception of signals. Should the speed of the airplane become excessive the disk 18 would rotate to move the openings 26 and 28 out of the field of light and bring the group of openings 27 into the field and this group will gradually increase the sound in the phones until the point of danger is reached at 29 whereupon the abrupt reversal in the arrangement of the openings due to the fact that the openings at 29 are pointed in opposite directions, will result in an abrupt and loud-blasting warning signal in the phones, increasing until the largest opening 30 arrives at the light element 21. When speed is reduced the operation of the disk will be reversed and when normal speed is attained, the openings 28 will be within the light area where minimum disturbance will be set up in the phones.

The knob 34 provides a means by which the pilot may cause the stall-warning to be sounded at any speed desired. For instance while an aircraft may have a particular stalling speed under normal conditions, severe icing conditions might change the stalling speed and necessitate an adjustment in the instrument. As the shaft 33 has a threaded engagement with nut 31 carried by hanger 12, rotation of the shaft by the knob 34 will cause the diaphragm and the parts carried thereby to be advanced or retarded so as to correspondingly advance or retard the stall-warning indication with relation to air speed. Gears 35 and 36, which are speed reduction gears, serve to operate the pointer or hand 37 for calibration purposes over the scale or dial 38. This scale or dial preferably is calibrated in M. P. H. stall-warning indications. The scale can also include a calibration in M. P. H. for maximum speed warning purposes to be used on fighting aircraft only.

Although the oscillator, as herein stated, can be part of an existing radio receiver, it can, of course, be a separate instrumentality.

The photo-electric cell and the light element can be removably mounted in opposed walls of the housing 19 so that repairs or replacements can be made without disturbing any of the other parts.

Importance is attached to the fact that the openings in disk 18 are triangular so that under normal conditions as each opening moves into the field of light away from normal running position, each disturbance produced by the light beam through the opening in the path thereof will gradually increase in volume and then abruptly cut off as the opening passes out of the field of light.

In practice it has been found that an instrument such as herein described is very useful in detecting by aural means the speed of a plane while landing and at other times when reliance upon visual indicators is not entirely safe.

What is claimed is:

1. An aural indicator of air speed for use in airplanes including a housing, a diaphragm therein, a Pitot tube having a dynamic pressure chamber in communication with said diaphragm and a static pressure chamber in communication with the housing, a photo-electric cell, a telephone receiver, an electrical connection between the telephone receiver and the photo-electric cell, said connection including an oscillator circuit, a light element, and a movable signal-modulating member extending between the light element and the photo-electric cell and operatively connected to the diaphragm, said member having apertures of different sizes positioned for movement successively into the path of a light beam directed on the photo-electric cell from the light element.

2. The combination with a Pitot tube and means including a diaphragm actuated by differences in dynamic and static pressures in the tube, of a telephone receiver circuit including a head-phone, an oscillator and a photo-electric cell, a light element for directing a light beam toward the photo-electric cell, and means actuated by the diaphragm under action of variations in pressures in the Pitot tube, for intermittently changing the size of the light beam received by the photo-electric cell thereby to create in the head-phone an intermittent disturbance increasing in volume and intensity in proportion to any changes in dynamic pressure from a normal setting.

3. An aural indicator of air speed for use on airplanes including a Pitot tube having a dynamic pressure chamber and a static pressure chamber, a telephone-receiving circuit including head-phones, a circuit leading thereto having a photo-electric cell and an oscillator, the photo-electric cell being connected to the grid circuit of the oscillator, means for directing a light beam toward the photo-electric cell, and means controlled by variations in dynamic and static pressures in the Pitot tube for correspondingly varying the size of the light beam directed against the photo-electric cell, said means cooperating with the photo-electric cell to set up in the phones an interference increasing or reducing in proportion to the increase or reduction in the size of the light beam.

4. An aural indicator of air speed for airplanes including a Pitot tube having a dynamic pressure chamber and a static pressure chamber, means including a diaphragm shiftable by variations in the relative pressures in said chambers, a telephone circuit including a receiver, a photo-electric cell, an electrical connection between said cell and the receiver, said connection including an oscillator the grid circuit of which is connected to the photo-electric cell, an element for directing a light beam onto the photo-electric cell thereby to set up a disturbance in the receiver, and means under the control of the diaphragm for increasing or reducing the size of the beam and proportionately increasing and reducing the interference in the receiver in proportion to variations in the relative dynamic and static pressures in the Pitot tube.

5. An aural indicator of air speed for airplanes including a Pitot tube having a dynamic pressure chamber and a static pressure chamber, means including a diaphragm shiftable by variations in the relative pressures in said chambers, a telephone circuit including a receiver, a photo-electric cell, an electrical connection between the cell and the receiver, said connection including an oscillator the grid circuit of which is connected to the photo-electric cell, an element for directing a light beam onto the photo-electric cell thereby to set up a disturbance in the receiver, and means under the control of the diaphragm for increasing or reducing the size of the beam and proportionately increasing and reducing the interference in the receiver in proportion to variations in the relative dynamic and static pressures in the Pitot tube, said means including a disk having a circular series of openings positioned to move successively into the light area to control the size of the beam, a plurality of said openings increasing in size successively away from a normal speed position containing minute openings, each of said plurality of openings having walls converging to a point directed toward the minute openings and all of the openings cooperating during the movement of the disk within the light field for setting up an intermittent disturbance in the receiver with a staccato effect.

6. An aural indicator of air speed for use in airplanes including a housing, a diaphragm therein, a Pitot tube having a dynamic pressure chamber in communication with said diaphragm and a static pressure chamber in communication with the housing, a photo-electric cell, a telephone receiver, an electrical connection between said receiver and the photo-electric cell, said connection including an oscillator circuit, a light element, a movable signal-modulating member extending between the light element and the photo-electric cell and operatively connected to the diaphragm, said element having apertures of different sizes positioned for movement successively into the path of a light beam directed on the photo-electric cell from the light element, and means under the control of the user for shifting the position of the diaphragm relative to the movable member thereby to change the normal or starting position of said member.

7. The combination with a Pitot tube and means including a diaphragm actuated by differences in dynamic and static pressures in the tube, of a telephone receiver circuit including an oscillator and a photo-electric cell, a light element for directing a light beam toward the photo-electric cell, means actuated by the diaphragm under action of variations in pressures in the Pitot tube, for intermittently changing the size of the light beam received by the photo-electric cell thereby to create in the receiver an intermittent disturbance increasing in volume and intensity in proportion to any changes in dynamic pressure from a normal setting, and means under the control of the user for advancing or retarding the action of the disturbance-producing means.

8. An aural indicator of air speed for use in airplanes including a housing, a diaphragm therein, a Pitot tube having a dynamic pressure chamber in communication with said diaphragm and a static pressure chamber in communication with the housing, a telephone receiver, a photo-electric cell, an electrical connection between the receiver and the photo-electric cell, said connection including an oscillator circuit, a light element, a movable signal-modulating member extending between the light element and the photo-electric cell and operatively connected to the diaphragm, said element having apertures of different sizes positioned for movement successively into the path of a light beam directed on the photo-electric cell from the light element, and means under the control of the user for advancing and retarding the action of the signal-modulating member.

9. An aural indicator of air speed for use in airplanes including a housing, a diaphragm therein, a Pitot tube having a dynamic pressure chamber in communication with said diaphragm and a static pressure chamber in communication with the housing, a telephone receiver, a photo-electric cell, an electrical connection between the receiver and the photo-electric cell, said connection including an oscillator circuit, a light element, a movable signal-modulating member extending between the light element and the photo-electric cell and operatively connected to the diaphragm, said element having apertures of different sizes positioned for movement successively into the path of a light beam directed on the photo-electric cell from the light element, and means under the control of the user for advancing and retarding the action of the signal-modulating member, said means including a calibrated dial, a pointer cooperating therewith, and means for simultaneously actuating the pointer and bodily shifting the diaphragm from one position to another relative to said member.

10. An aural indicator of air speed for use in airplanes including a housing, a diaphragm therein, a Pitot tube having a dynamic pressure chamber in communication with said diaphragm and a static pressure chamber in communication with the housing, a telephone receiver, a photo-electric cell, an electrical connection between the receiver and the photo-electric cell, said connection including an oscillator circuit, a light element, a movable signal-modulating member extending between the light element and the photo-electric cell and operatively connected to the diaphragm, said member having apertures of different sizes positioned for movement successively into the path of a light beam directed on the photo-electric cell from the light element, and means under the control of the user for bodily shifting the diaphragm relative to said member and independently of variations in pressures within the Pitot tube.

MICHAEL FRANK HALL.